United States Patent [19]

Takeda et al.

[11] Patent Number: 4,812,669
[45] Date of Patent: Mar. 14, 1989

[54] HARMONIC SUPPRESSING DEVICE

[75] Inventors: Masatoshi Takeda; Kazuo Ikeda; Yoshiharu Tominaga; Kenji Mori, all of Hyogo, Japan

[73] Assignee: Mitsubishi Denki Kabushiki Kaisha, Tokyo, Japan

[21] Appl. No.: 66,203

[22] Filed: Jun. 25, 1987

[30] Foreign Application Priority Data

| Jun. 26, 1986 | [JP] | Japan | 61-148102 |
| Jun. 26, 1986 | [JP] | Japan | 61-148103 |
| Jun. 26, 1986 | [JP] | Japan | 61-148104 |
| Jun. 26, 1986 | [JP] | Japan | 61-148105 |
| Jun. 27, 1986 | [JP] | Japan | 61-151963 |
| Jun. 27, 1986 | [JP] | Japan | 61-151964 |
| Nov. 21, 1986 | [JP] | Japan | 61-279079 |

[51] Int. Cl.$^4$ .......................... H02P 13/30; H02J 3/18
[52] U.S. Cl. ........................ 307/105; 307/11; 363/98; 363/132; 363/161; 323/207; 323/210
[58] Field of Search ........................... 307/103–107, 307/3, 39; 363/35, 37–48, 51, 54, 79, 86, 95, 96, 98, 113, 124, 135, 132, 161, 162; 323/210, 211, 207, 209, 248, 263

[56] References Cited

U.S. PATENT DOCUMENTS

| 3,900,792 | 8/1975 | Moltgen | 323/207 |
| 3,963,978 | 6/1976 | Kelley et al. | 323/210 |
| 3,992,661 | 11/1976 | Kelley | 323/210 |
| 4,418,380 | 11/1983 | Tanaka et al. | 363/161 X |
| 4,615,000 | 9/1986 | Fujii et al. | 363/98 |
| 4,673,823 | 6/1987 | Tanaka | 307/11 |
| 4,677,539 | 6/1987 | Erickson et al. | 363/132 |

OTHER PUBLICATIONS

The Showa 61st, National Convention of Institute of Electrical Engineers of Japan, "One of Studies in Connection with Cyclo-Converter Higher Harmonic Accommodation Characteristic with Active Filter", 1986, p. 660.

Kobayashi et al., Meiden GIHO Technical Report, vol. 184, No. 5, "New Active Harmonic Suppressor Application", 1985, pp. 20–23.

Akagi et al., IEEE Transactions on Industry Applications, vol. 1A-22, No. 3, "Control Strategy of Active Power Filters Using Multiple Voltage-Source PWM Converters", May/Jun. 1986, pp. 460–465.

Primary Examiner—William M. Shoop, Jr.
Assistant Examiner—Paul Ip
Attorney, Agent, or Firm—Bernard, Rothwell & Brown

[57] ABSTRACT

A harmonic suppressing device provided in a power system such as, for example, a transmission and distribution system or a power generating system, to filter higher harmonic currents generated by a higher harmonic current source of the power system such as, for example, a cycloconverter. The harmonic suppressing device comprises, as the principal components thereof, a passive filter serving as a high-order higher harmonic filtering unit for filtering higher harmonic currents of comparatively high order among those generated by the higher harmonic current source, and an active filter serving as low-order higher harmonic filtering unit for filtering higher harmonic currents of comparatively low orders among those generated by the higher harmonic current source. The active filter comprises: a main active filtering circuit comprising a plurality of switching transistors, rectifying diodes combined with the switching transistors, respectively, a capacitor, and a reactor; an operating circuit which calculates controlling data for controlling the commutating action of the main active filtering circuit on the basis of the detected values of the higher harmonic currents that flows into the power source side of the power system and the detected values of the output voltage of the higher harmonic current source; and a control circuit which gives control signals such as, for example, pulse width modulating signals to the main active filtering circuit. The harmonic suppressing device is capable of filtering higher harmonic currents in a wide frequency band.

9 Claims, 11 Drawing Sheets

ANTIRESONANCE FREQUENCY BANDWIDTH

ANTIRESONANCE FREQUENCY BANDWIDTH (a) LOAD CURRENT ($i_L$) ($i_L = i_B + i_H$)

(b) COMPENSATION CURRENT ($i_C$) ($i_C = i_H$)

(c) SYSTEM CURRENT AFTER COMPENSATION ($i_S$)

HARMONIC SUPPRESSING DEVICE

BACKGROUND OF THE INVENTION

1. Field of the Invention

The present invention relates to a harmonic suppressing device for suppressing higher harmonics generated by higher harmonic current sources provided in the power transmission system, power distributing system and/or power circuit of various industrial equipments and, more specifically, to a harmonic suppressing device for suppressing higher harmonics which are generated by a rectifier such as a thyristor, a nonlinear load equipment such as an arc furnace or the saturation of the core of a transformer, and cause various troubles such as noise generation, the overheat of the components of the equipments, television disturbance and faults in control systems.

2. Description of the Prior Art

In recent years, higher harmonic troubles attributable particularly to semiconductor rectifiers employing thyristors or power converters comprising thyristors such as, for example, cycloconverters, occur frequently in power transmission systems and power distributing systems. Various measures have been taken with the progress of semiconductor techniques to eliminate such higher harmonic troubles.

FIGS. 1A, 1B and 2 are a circuit diagram, a circuit diagram of an equivalent circuit and a graph showing the characteristics of the equivalent circuit, respectively, of an exemplary conventional receiving and distributing equipment having the possibility of higher harmonic generation. Referring to FIG. 1A, the receiving and distributing equipment comprises an AC power source 1 such as, for example, an AC generator, a higher harmonic current source 2 which generates a higher harmonic current $I_H$ when driven by power supplied thereto from the AC power source 1, namely, a load power converter such as, for example, a cycloconverter, and a passive harmonic filtering device 3 for filtering higher harmonic currents generated by the higher harmonic current source 2 such as, for example, a passive filter. The power source 1 and a line 4 produce a generator impedance and a line impedance, respectively. The sum of the generator impedance and the line impedance is indicated by an impedance (represented by a parameter "$L_{PS}$")5. The harmonic filtering device 3 such as, for example, a passive filter, is an LC tuning filter comprising, for example, an inductance 6 (represented by a parameter "$L_f$") and a capacitance 7 (represented by a parameter "$C_f$")

The receiving and distributing equipment is represented by an equivalent circuit shown in FIG. 1B. The impedance characteristics Z of $L_{PS}$ on the side of the load in FIG. 1B, namely, the higher harmonic current source 2, is shown in FIG. 2.

The operation of the receiving and distributing equipment thus constituted will be described hereinafter. Suppose that the frequency of a higher harmonic current $I_H$ produced by the higher harmonic current source 2 is $f_R$. Higher harmonics attributable to the higher harmonic current $I_H$ are eliminated by the harmonic filtering device 3 by making the tuned frequency coincide with the frequency $f_R$ on the basis of the following Expression.

$$\text{Tuned frequency} = f_R = \tfrac{1}{2}\pi\sqrt{L_f C_f} \tag{1}$$

where $f_R$ is the frequency of the higher harmonic current $I_H$, $L_f$ is the value of inductance of the inductance 6 of the harmonic filtering device 3, and $C_f$ is the capacitance of the capacitor 7 of the harmonic filtering device 3. Thus, the inductance $L_f$ and the capacitance $C_f$ are determined from Expression (1).

In FIG. 1A, designated by $I_C$ and $I_S$ are a current that flows into the harmonic filtering device 3 and a current that flows out from the harmonic filtering device 3 into the AC power source 1, respectively.

In the harmonic filtering device 3, since the tuned frequency is adjusted to $f_R$ to filter higher harmonic currents among the higher harmonic current $I_H$, the current $I_S$ that flows into the AC power source 1 can be suppressed when the variation of the frequency $f_R$ of the higher harmonic current $I_H$ is moderate and is maintained substantially at a fixed level. However, when the frequency $f_R$ is variable, the higher harmonic current $I_S$ that flows into the AC power source 1 increases as the frequency $f_R$ approaches resonance frequency (antiresonance frequency) $f_{AR}$ between the impedance $L_{PS}$ and the passive filter, namely, the harmonic filtering device 3 in the foregoing equipment. Such a relation is expressed by $$f_{AR} = \tfrac{1}{2}\pi\sqrt{(L_f + L_{ps}) \cdot C_f} \tag{2}$$

Such a passive harmonic filtering device is unable to suppress higher harmonic currents effectively when the range of variation of the frequency $f_R$ including the antiresonance frequency $f_{AR}$ is wide.

Another exemplary harmonic suppressor connected to a three-phase AC power source among those which suppress higher harmonics on the above-mentioned principle of operation will be described hereinafter.

FIGS. 3 and 4 illustrate a conventional harmonic suppressor disclosed in Nisshin Denki Giho (technical report), issued by Nisshin Denki (electric apparatus) Co., Ltd., Jan., 1979. In FIGS. 3 and 4, parts similar to or corresponding to those previously described with reference to FIGS. 1A and 1B are denoted by the same reference characters. Referring to FIG. 3, a distributing equipment comprises a three-phase AC power source 1 comprising AC power sources 1a, 1b and 1c, a higher harmonic current source 2 as a load such as, for example, a load cycloconverter, and, for example, a passive harmonic filtering device 3. An impedance 5 including inductive impedances 5a, 5b and 5c is produced in wires 4a, 4b and 4c forming a line 4 interconnecting the AC power sources, 1a, 1b and 1c and the higher harmonic current source 2. The harmonic filtering device 3 comprises a reactor 6, a capacitor 7 and a resistor 8. The reactor 6 includes reactors 6a, 6b and 6c respectively for the wires 4a, 4b and 4c, the capacitor 7 includes capacitors 7a, 7b and 7c respectively for the wires 4a, 4b and 4c, while the resistor 8 includes resistances 8a, 8b and 8c respectively for the wires 4a, 4b and 4c.

The manner of operation of the harmonic filtering device 3 will be described hereinafter. When the higher harmonic current source 2 is, for example, a 12-phase cycloconverter, the main components of the higher harmonic current $I_H$ produced by the cycloconverter are 11th and 13th higher harmonics. Accordingly, the passive harmonic filtering device 3 is designed so as to be tuned at a frequency substantially corresponding to that of the 11th harmonic. Since the impedance 5 of the line 4, in general, is an inductive impedance as mentioned above, a ratio $I_S/I_H$, where $I_H$ is a higher harmonic current produced in the circuit of FIG. 3 and $I_S$ a higher harmonic current that flows into the power source 1, has characteristics as shown in FIG. 4. The most part of the higher harmonic current $I_H$ is absorbed by the reactor 6 and capacitor 7 of the passive filter at a tuning point A near the 11th higher harmonic, and hence curve representing the variation of the ratio $I_S/I_H$ has a minimum at the point A as shown in FIG. 4. On the contrary, the curve of the ratio $I_S/I_H$ has a maximum at a point B due to antiresonance between the harmonic filtering device 3 and the power source 1, and the higher harmonic current increases. The degree of the increase of the higher harmonic current is dependent on the resistance of the resistor 8. When the resistance of the resistor 8 is small, the higher harmonic current is increased by a magnification in the range of ten to twenty, and thereby the extraordinarily large higher harmonic current $I_S$ flowing into the power source has injurious influences upon the power supply system.

The conventional harmonic suppressor thus constituted inevitably has an antiresonance point, where the very large magnification of the higher harmonic current occurs. Accordingly, the passive filter of the harmonic suppressor is designed so that the antiresonance point thereof such as the point B shown in FIG. 4 will not coincide with the orders of higher harmonics to obviate the injurious influences of the magnified higher harmonic currents upon the power supply system.

However, when the higher harmonic current source 2 is a cycloconverter, the order of a higher harmonic current necessarily coincides with the antiresonance point since the frequency of the generated higher harmonic current varies according to the output frequency of the cycloconverter as represented by Expression (3) shown hereinafter. Accordingly, it is impossible to obviate the occurrence of the very large magnification of the higher harmonic current.

The frequency $f_n$ of an nth higher harmonic current is expressed by $$f_n = (6m \pm 1)f_1 \pm 6k \cdot f_0 \quad (3)$$

where n is the order of a higher harmonic current, $f_1$ is the frequency of a fundamental wave, $f_0$ is the output frequency of the cycloconverter, and m and k are integral numbers.

For example, when $m=1$, $f_1=60$ Hz, $f_0=0$ to 10 Hz, and $k=1$, the frequency $f_5$ of the fifth higher harmonic current varies in the range of 240 to 360 Hz, namely, in the range of the fourth to sixth higher harmonic, while the frequency $f_7$ of the seventh higher harmonic current varies in the range of 360 to 480 Hz, namely, in the range of the sixth to the eighth higher harmonic, so that the frequency varies continuously in the range of the fourth to the eighth higher harmonic when both the fifth and seventh higher harmonic currents are taken into consideration. Therefore, a higher harmonic current of an order which coincides with the antiresonance point B (FIG. 4) is produced inevitably.

In the 12-phase cycloconverter, higher harmonic currents of orders above the fifth are produced and, theoretically, the fifth higher harmonic current or the seventh higher harmonic current cannot be produced. However, in practice, the fifth and seventh higher harmonic currents are produced due to unbalance between the six phases, and the fifth and seventh higher harmonic currents are magnified by resonance.

Thus, the conventional passive filter is unable to avoid the magnification of higher harmonic currents at the antiresonance point when the frequency of the higher harmonic current is variable as the frequency of higher harmonic current produced by a cycloconverter, and hence such a conventional passive filter is unable to eliminate injurious influences on the associated system.

Furthermore, in the conventional passive filter, it is necessary to increase the resistance of the resistor 8 to reduce the ratio of higher harmonic magnification. However, although the ratio of higher harmonic magnification at the antiresonance point B' is reduced when the resistance of the reactor 8 is increased, the higher harmonic absorption ratio near the resonance point A' is reduced and electrical loss across the resistor 8 increases.

SUMMARY OF THE INVENTION

Accordingly, it is an object of the present invention to provide a harmonic suppressing device capable of suppressing antiresonance and absorbing higher harmonic current even if the frequency of the higher harmonic current generated by a higher harmonic current source varies over a wide range including the antiresonance point and the resonance point.

It is a further object of the present invention to provide a harmonic suppressing device capable of preventing the magnification of higher harmonic currents at the antiresonance point even when the higher harmonic current source is a cycloconverter, and capable of preventing injurious influences of higher harmonic currents on the associated system such as, for example, a power generating system, a power transmission system or a power distributing system.

It is still a further object of the present invention to provide a harmonic suppressing device employing a resistor having an ordinary resistance for reducing the ratio of magnification of higher harmonic currents and hence capable of preventing the reduction of higher harmonic absorption ratio at the resonance point (point A') and suppressing the increase of electrical loss attributable to the increase of the resistance of the resistor.

To achieve the foregoing objects of the invention, the present invention provides a harmonic suppressing device having a high-order higher harmonic filtering unit, such as a passive filter, which absorbs higher harmonic currents of higher orders among the higher harmonic currents generated by a higher harmonic current source, and a low-order higher harmonic filtering unit, such as an active filter, which absorbs higher harmonic currents of lower orders among the higher harmonic currents generated by the higher harmonic current so A possible low-order higher harmonic filtering unit is a differentiating circuit which detects higher harmonic currents and processes the higher harmonic currents through phase-lead operation or a phase-lag network capable of first order lag operation.

DETAILED DESCRIPTION OF THE PREFERRED EMBODIMENTS

Harmonic suppressing devices, in preferred embodiments, according to the present invention will be described hereinafter with reference to the accompanying drawings.

Figure 5:
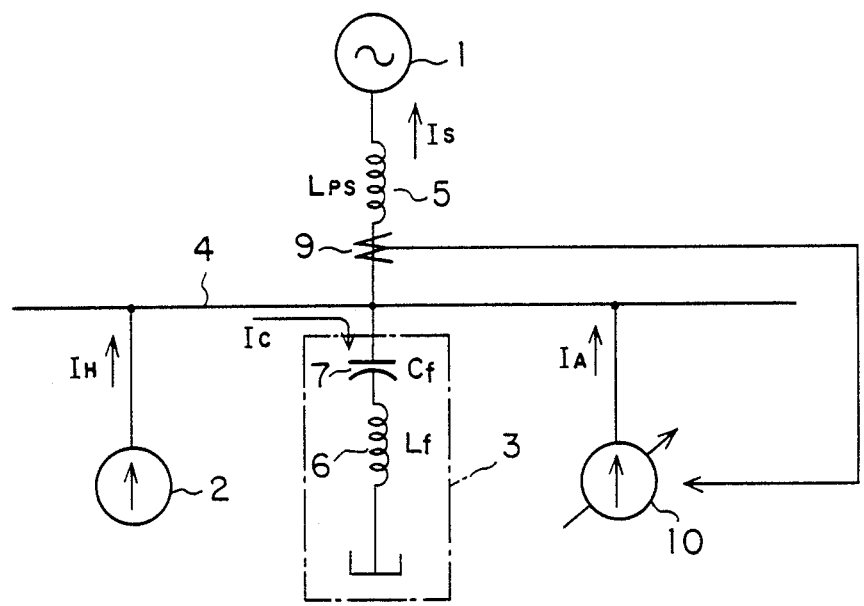
FIG. 5 is a circuit diagram of a harmonic suppressing device, in a first embodiment, according to the present invention.
Figure 6:
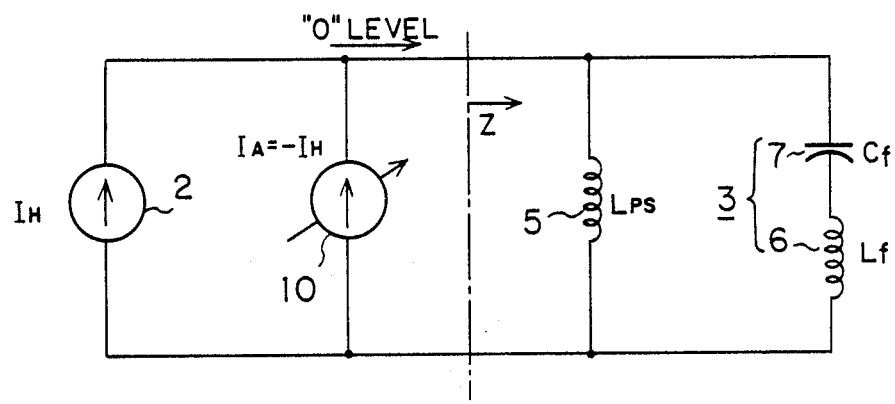
FIG. 6 is an equivalent circuit of the harmonic suppressing device of FIG. 5.
Figure 7:
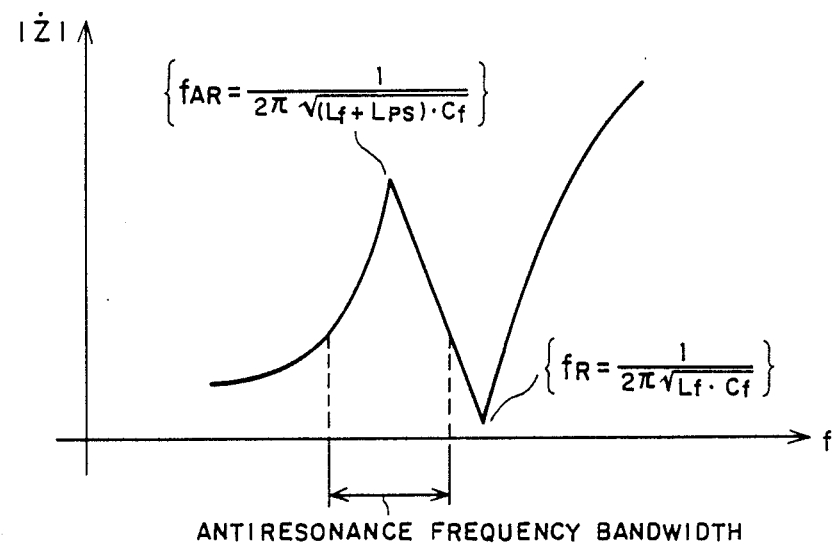
FIGS. 7(a) and 7(b) are a graph showing the impedance characteristics of the equivalent circuit of FIG. 6 and a graph showing a waveform indicating the operating range of the harmonic suppressing device of FIG. 5, respectively.
Figure 7:
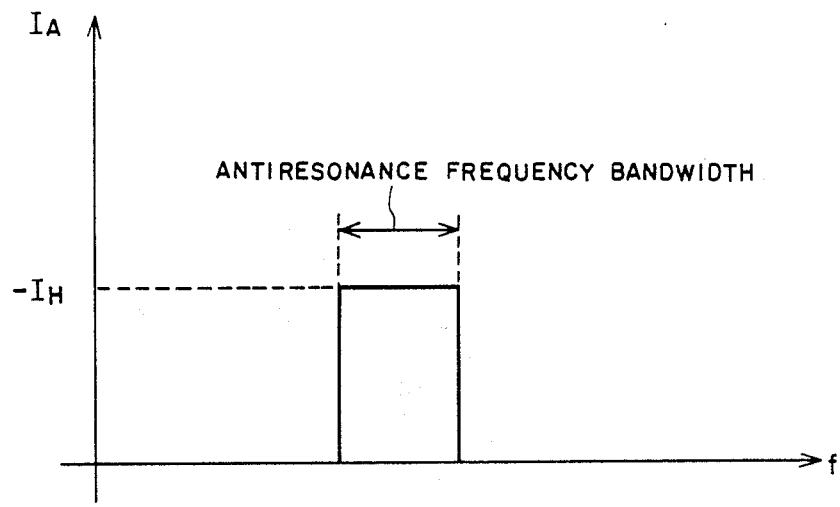

A first embodiment of the present invention will be described with reference to FIGS. 5 to 7. In FIG. 5, parts denoted by reference numerals 1 to 7 are the same as or correspond to those denoted by the same reference numerals in FIG. 1A, and hence the description thereof will be omitted to avoid duplication.

The harmonic suppressing device in a first embodiment comprises a passive filter 3 as a high-order higher harmonic filtering unit, an active filter 10 as a low-order higher harmonic filtering unit, and a higher harmonic current detector 9 which gives a detection signal upon the detection of an outflow higher harmonic current $I_S$ which flows into a power source 1. The active filter 10 is a well-known device such as, for example, an inverter including a pulse width modulator (PWM), capable of generating an optional higher harmonic current $I_A$ of an optional frequency.

The manner of operation of the harmonic suppressing device will be described hereinafter. The high-order higher harmonic filtering function of the harmonic suppressing device is substantially the same as that of the conventional passive filter previously described with reference to FIGS. 1A, 1B and 2; the harmonic suppressing device absorbs higher harmonic currents from a higher harmonic current $I_H$ as shown in FIG. 7(a) by means of the reactor 6 and the capacitor 7. The higher harmonic current detector 9 detects an outflow higher harmonic current $I_S$ which flows into the power source 1, and then gives a detection signal to the active filter 10. Upon the reception of the detection signal from the higher harmonic current detector 9, the output level and output frequency of the active filter 10 are controlled so as to generate a higher harmonic current $I_A = -I_H$ as shown in FIG. 7(b) in an antiresonance frequency band in which the outflow higher harmonic current $I_S$ increases to cancel the higher harmonic currents in the neighborhood of the antiresonance point.

Thus, the harmonic suppressing device is able to suppress the outflow higher harmonic current $I_S$ to zero in the antiresonance frequency band by the output current $I_A$ of the active filter 10. Furthermore, since the passive filter 3 and the active filter 10 are employed in combination, the passive filter 3 is assigned to the resonance frequency band, while the active filter 10 is assigned to the antiresonance frequency band, the manufacturing cost of the harmonic suppressing device relating to the active filter is reduced, which is a characteristic effect of the first embodiment.

A harmonic suppressing device in a second embodiment will be described hereinafter with reference to FIGS. 8 to 11.

Figure 1A:
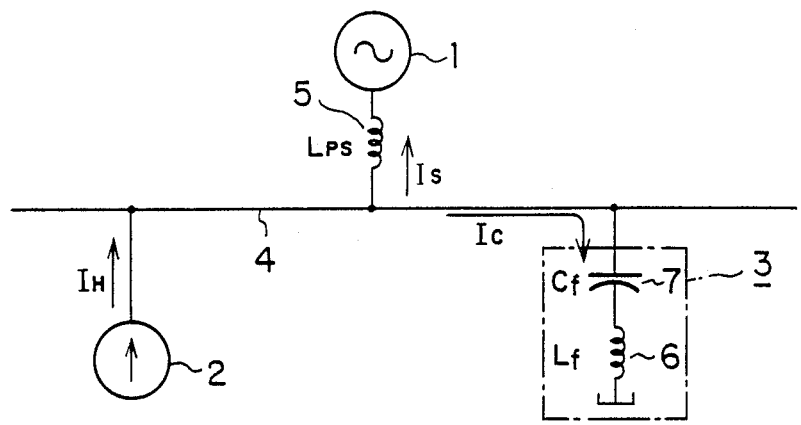
FIG. 1A and 1B are a circuit diagram and an equivalent circuit diagram, respectively, of an exemplary conventional passive filter.
Figure 1B:
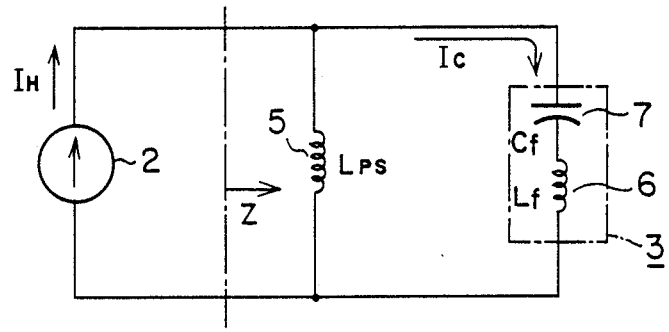
Figure 2:
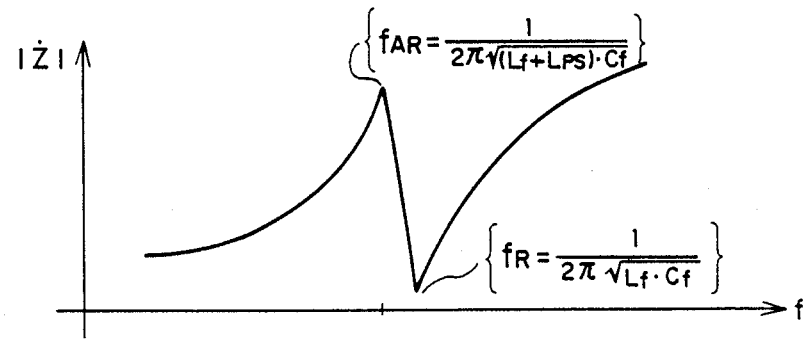
FIG. 2 is a graph showing the characteristics of higher harmonic currents in the circuit shown in FIGS. 1A and 1B.
Figure 3:
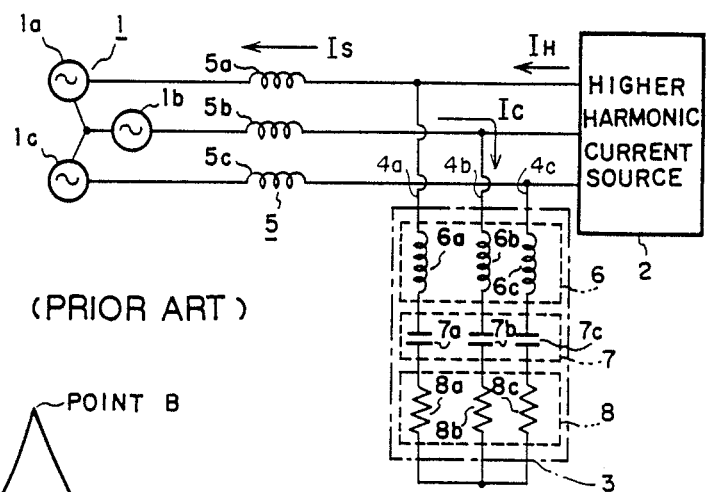
FIG. 3 is a circuit diagram of another exemplary conventional three-phase AC harmonic suppressing device.
Figure 4:
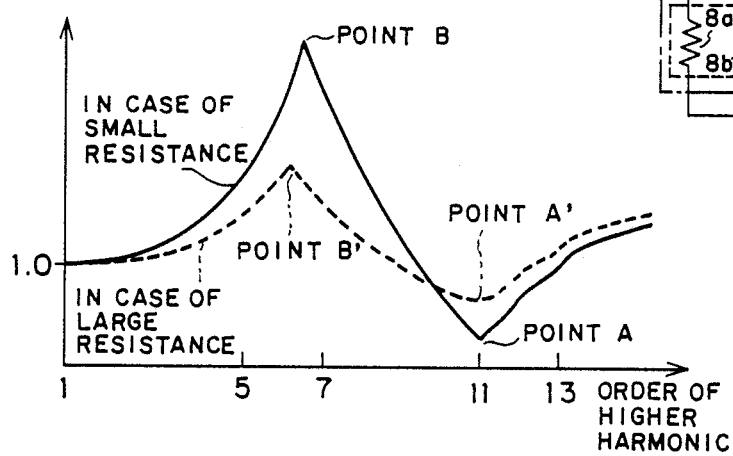
FIG. 4 is a graph showing the characteristics of higher harmonic currents in a system associated with the harmonic suppressing device of FIG. 3.
Figure 8:
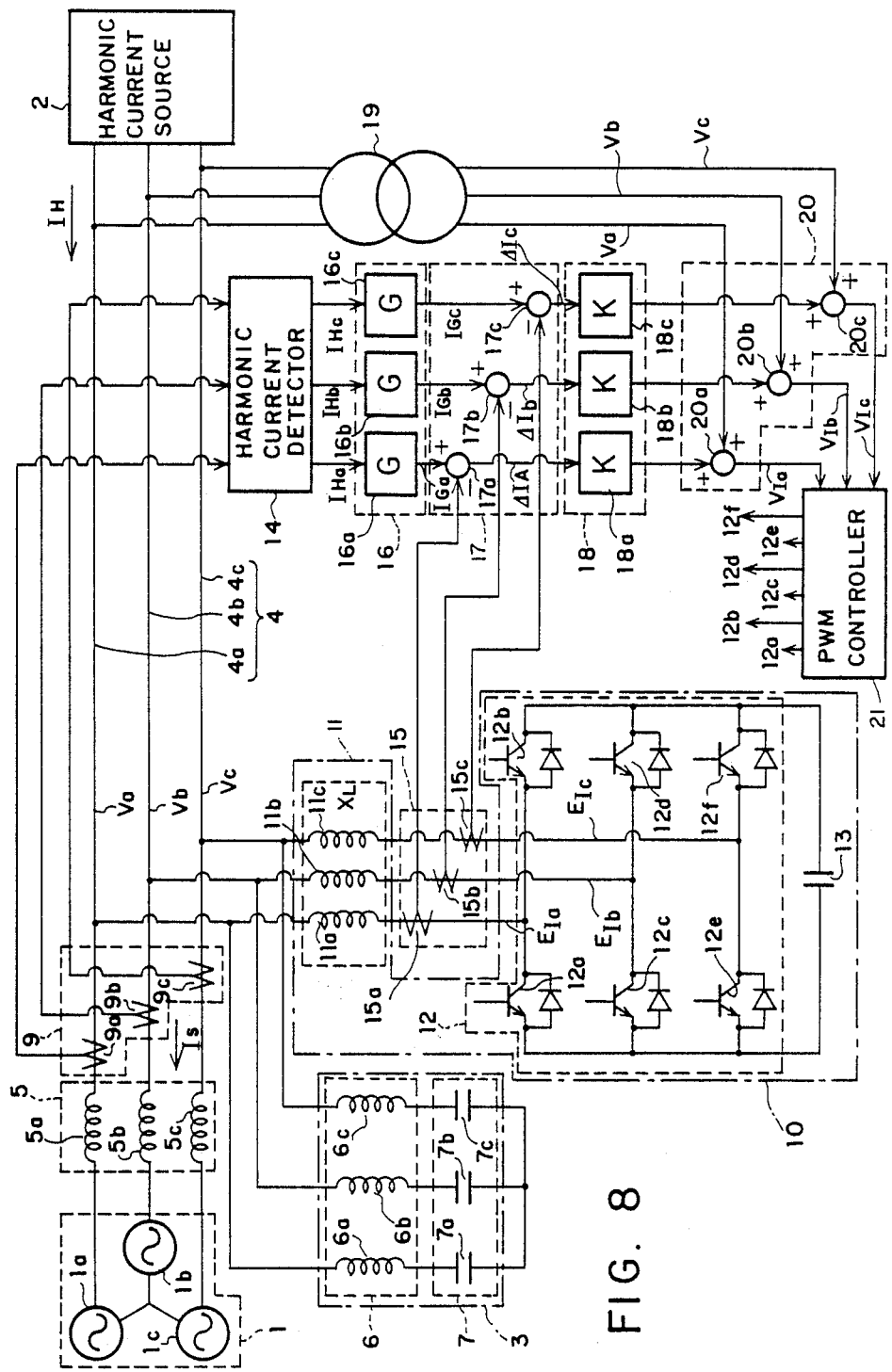
FIG. 8 is a circuit diagram of a harmonic suppressing device, in a second embodiment, according to the present invention.

FIG. 8 is a circuit diagram of a system, for example, a power distributing system, provided with a harmonic suppressing device in the second embodiment of the present invention. In FIG. 8, parts similar to or corresponding to those previously described with reference to FIGS. 1A, 3 and 5 are denoted by the same reference numerals. Fundamentally, the second embodiment is substantially the same in constitution as the first embodiment. Whereas the first embodiment represents the general constitution of the present invention, the second embodiment and a third embodiment, which will be described hereinafter, represent the detailed constitution of the present invention.

Referring to FIG. 8, an active filter 10 employed as the low-order higher harmonic filtering unit of the harmonic suppressing device comprises a reactor 11, a transistor switch 12 comprising switching transistors 12a to 12f each provided with a rectifying diode, and a capacitor 13. A supply current transforming circuit 9 is provided in the line 4 interconnecting the power source 1 and the higher harmonic current source 2 to detect the supply current of the power source 1. The supply current transforming circuit 9 has current transformers 9a, 9b and 9c provided in the wires 4a, 4b and 4c, respectively, of the line 4. The current transformers 9a, 9b and 9c are connected to a higher harmonic current detecting circuit 14. The active filter 10 includes a current transforming circuit 15 for detecting the current flowing through the active filter 10. The current transforming circuit has current transformers 15a, 15b and 15c. The output of the current transforming circuit 15 is connected to a subtracting circuit 17 having subtracters 17a, 17b and 17c. The higher harmonic current detecting circuit 14 is connected through a gain control circuit 16 to the subtracting circuit 17. The subtracters 17a, 17b and 17c of the subtracting circuit 17 are connected to the amplifiers 18a, 18b and 18c, respectively, of an amplifying circuit 18. The amplifiers 18a, 18b and 18c and a voltage transformer 19 for detecting the respective voltages of the wires 4a, 4b and 4c of the line 4 are connected to an adding circuit 20 having adders 20a, 20b and 20c. A PWM control circuit 21 which gives control signals to the switching transistors 12a to 12f of the transistor switch 12 is connected to the adding circuit 20.

The manner of operation of the harmonic suppressing device in the second embodiment will be described hereinafter. First, the principle of operation based on the fundamental constitution shown in FIG. 8 will be described with reference to simplified circuits shown in FIGS. 9A and 9B showing a single-phase equivalent circuit of the passive filter serving as a high-order higher harmonic filtering unit, and a single-phase equivalent circuit of the harmonic suppressing device including the active filter serving as a low-order higher harmonic filtering unit, respectively.

Figure 9A:
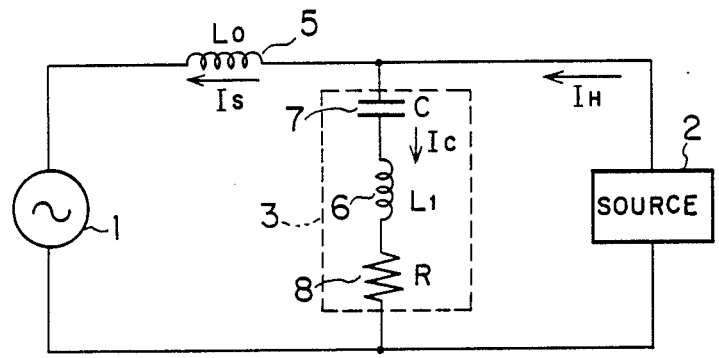
FIGS. 9A and 9B are a circuit diagram of a passive filter employed as the high-order higher harmonic filtering unit of the second embodiment, and an active filter employed as the low-order higher harmonic filtering unit of the second embodiment, respectively.

Referring to FIG. 9A, a passive filter 3 comprises a reactor 6, a capacitor 7 and a resistor 8. In FIG. 9B, an active filter 10 is represented by a variable current source. An outflow current transformer 9 for detecting a current which flows into a power source 1 is connected through an amplifying circuit 14 having an amplification factor G to the active filter 10.

Figure 9B:
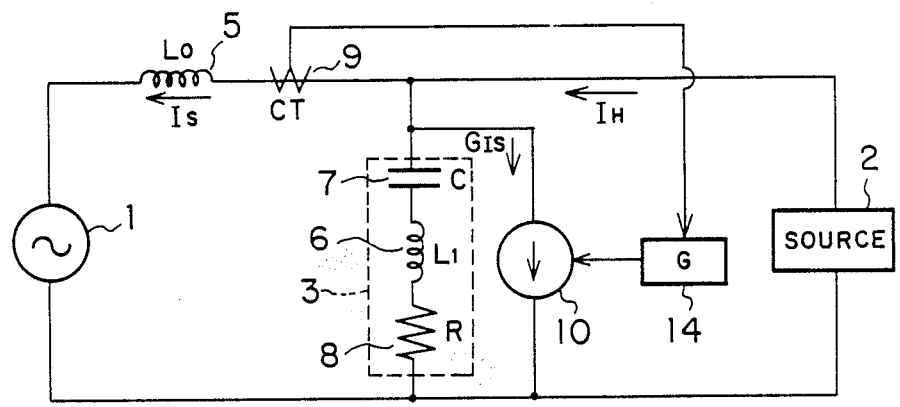

Referring to FIGS. 9A and 9B, a higher harmonic current $I_H$ generated by the higher harmonic current source 2 flows toward the AC power source 1. Then, a current $I_S$ expressed by the following Expression (4) is generated by a resonance circuit including the impedance 5 of the system.

$$I_S = I_H \cdot Z_F/(Z_F + Z_S) \quad (4)$$

$$Z_S = L_0 \cdot S$$

where $L_0$ is inductance among the impedance 5, $L_1$ is the inductance of the reactor 6 of the passive filter 3, C is the capacitance of the capacitor 7 of the passive filter 3, R is the resistance of the resistor 8 of the passive filter 3, S is operator for Laplace transformation, and $Z_S$ and $Z_F$ are the impedance of the power source and the filter, respectively.

From Expression (4), it is known that the higher harmonic current is magnified in a range where $|Z_F + Z_S| < |Z_F|$. Such a higher harmonic current of a comparatively low-order is filtered by the active filter 10 shown in FIG. 9B.

The current transformer 9 (FIG. 9B) detects the outflow current $I_S$, and then the amplifying circuit 14 amplifies the outflow current $I_S$ by the amplification factor G to supply a current $G \cdot I_S$ to the active filter 10. Consequently, the higher harmonic current $I_S$ which flows through the power source 1 is $$I_S = (I_H - G \cdot I_S) - I_C \quad (5)$$

On the other hand, the higher harmonic current $I_S$ is expressed by $$I_S = Z_F(I_H - G \cdot I_S)/(Z_F + Z_S) = Z_M(I_H - G \cdot I_S) \quad (6)$$

where $Z_F$ is the impedance of the filter side, $Z_S$ is the impedance of the power source side, $Z_M = Z_F/(Z_F + Z_S)$, $Z_S = L_0 S$ and $Z_F = L_1 S + 1/CS + R$. Therefore, $$I_S/I_H = Z_M/(1 + G \cdot Z_M) \text{tm (7)}$$

Figure 10:
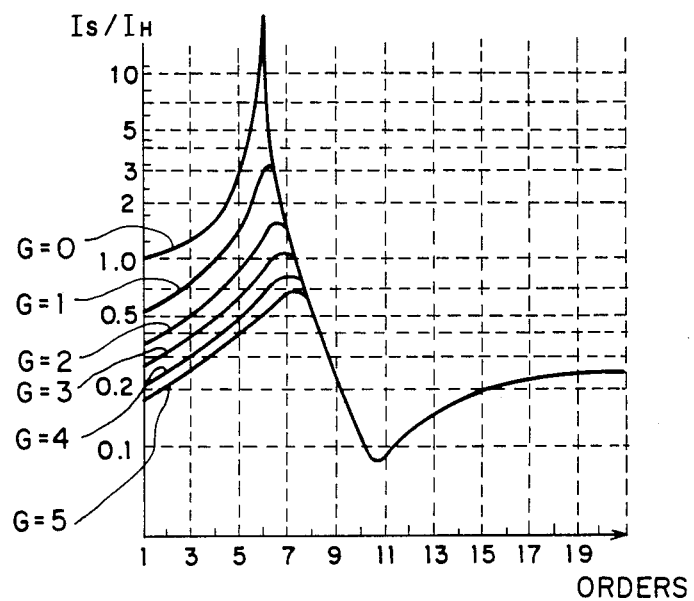
FIG. 10 is a graph showing the variation of higher harmonic current magnification ratio ($I_S/I_H$) with the order of higher harmonic currents for gain G.

FIG. 10 shows the variation of $I_S/I_H$ with the order of higher harmonic current for various values of G obtained from Expression (7).

Referring to FIG. 10, a condition G=0 corresponds to the omission of the active filter 10, and the passive filter 3 has a series resonance point for the 11th higher harmonic current and an antiresonance point for the 6th higher harmonic current. When G=0, the higher harmonic current is magnified by approximately twenty times near the antiresonance point.

The higher harmonic magnification ($I_S/I_H$) at the antiresonance point decreases with the increase of the compensating gain G of the active filter 10. When the gain G is in the range of 3 to 5, the value of $I_S/I_H$ near the 6th higher harmonic current is not greater than one, namely, the magnification of the higher harmonic current by resonance does not occur.

Figure 11:
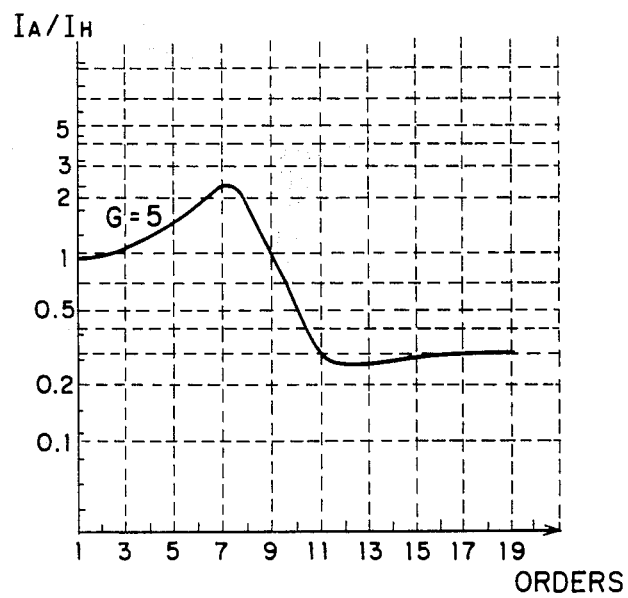
FIG. 11 is a graph showing a mode of variation of current ($I_A/I_H$) which flows into the active filter when gain G=5.

FIG. 11 is a graph showing the current that flows through the active filter 10 obtained from FIG. 10. It is known from FIG. 11 that the output current of the active filter 10 for higher harmonic currents of an order below the series resonance point of the passive filter 3 corresponds substantially to the current $I_H$, and the output current $I_C$ of the active filter 10 is far smaller than the current $I_H$ for higher harmonic currents of orders above the series resonance point of the passive filter 3. The characteristics shown in FIG. 11 have the following advantages. When the higher harmonic current source is, for example, a 12-phase cycloconverter, the principal higher harmonic currents generated by the cycloconverter is of the 11th and the 13th. To absorb all the 11th and 13th higher harmonic currents by the active filter 10, the active filter 10 needs to be of a large capacity, and hence the active filter 10 is an expensive one. When the 11th and 13th higher harmonic currents, namely, higher harmonic currents of comparatively high orders are absorbed by the comparatively inexpensive passive filter 3, the magnification of higher harmonic currents of lower orders attributable to the passive filter 3 is suppressed by the active filter 10, and comparatively small 5th and 7th higher harmonic currents are absorbed by the active filter 10, the capacity of the active filter 10 may be comparatively small, which is economically advantageous.

The harmonic suppressing device shown in FIG. 8 is a concrete example of a harmonic suppressing device having the foregoing advantage.

Referring to FIG. 8, the current $I_S$ which flows into the power source side is detected by the current transformers 9a, 9b and 9c. The current $I_S$ includes a fundamental component and higher harmonic components.

The fundamental component is filtered by the higher harmonic current detecting circuit 14 to detect only the higher harmonic components. The higher harmonic components $I_{Ha}$, $I_{Hb}$ and $I_{Hc}$ are applied to the gain amplifier 16a, 16b and 16c of the gain circuit 16, respectively, where the higher harmonic components are multiplied by the gain G to provide $$I_{Ga}=G \cdot I_{Ha}$$

$$I_{Gb}=G \cdot I_{Hb}$$

$$I_{Gc}=G \cdot I_{Hc}$$

The currents $I_{Ga}$, $I_{Gb}$ and $I_{Gc}$ are applied to the subtracters 17a, 17b and 17c, respectively, of the subtracting circuit 17. The subtracting circuit 17 calculates the respective differences $\Delta I_a$, $\Delta I_b$ and $\Delta I_c$ between the output currents $I_A$, $I_B$ and $I_C$ of the active filter 10 and the currents $I_{Ga}$, $I_{Gb}$ and $I_{Gc}$, and then applies the difference to the amplifiers 18a, 18b and 18c, respectively, of the amplifying circuit 18.

After amplifying the differences $\Delta I_a$, $\Delta I_b$ and $\Delta I_c$ by an amplification factor K, the amplifying circuit 18 gives the amplified differences to the adders 20a, 20b and 20c, respectively, of the adding circuit 20. The adders 20a, 20b and 20c add the amplified differences to the supply voltages $V_a$, $V_b$ and $V_c$, respectively, and give output voltages $V_{1a}$, $V_{1b}$ and $V_{1c}$ to the PWM control circuit 21. Then, the PWM control circuit 21 modulates the voltages $V_{1a}$, $V_{1b}$ and $V_{1c}$ by, for example, a carrier signal of a triangular waveform, and then gives the modulated PWM signals to the switching transistors 12a, 12b and 12c, respectively, of the transistor switch 12.

The transistor switch 12 operates for closing and opening in response to the PWM signals to provide inverter output voltages $E_{Ia}$, $E_{Ib}$ and $E_{Ic}$ corresponding to the control signals $V_{Ia}$, $V_{Ib}$ and $V_{Ic}$, respectively.

Consequently, currents $$I_{Aa}=(V_a-E_{Ia})/S_L$$

$$I_{Ab}=(V_b-E_{Ib})/X_L$$

$$I_{Ac}=(V_c-E_{Ic})/X_L$$

flow through the active filter 10. $I_{Aa}$, $I_{Ab}$ and $I_{Ac}$ are currents which flow through the phases of the active filter 10, respectively, and $X_L$ is the reactance of the reactor 11.

When the gain K is sufficiently large, the currents $I_{Aa}$, $I_{Ab}$ and $I_{Ac}$ become equal to the currents $I_{Ha}$, $I_{Hb}$ and $I_{Hc}$, respectively, so that the active filter 10 is able to make the necessary currents $I_{Ha}$, $I_{Hb}$ and $I_{Hc}$ flow. The output current $I_A$ of the active filter 10 thus controlled is G times the higher harmonic component of the outflow current $I_S$, and hence $$I_A=G \cdot I_H$$

Therefore, the characteristic curves as shown in FIGS. 10 and 11 are obtained.

The gain G is not necessarily constant; the gain G may be varied according to the range of output of the active filter. For example, the gain G may be a variable defined by $$G=G_0/(1+T_s)$$

where $G_0$ is a constant and $T_s$ is a time constant. The output of the active filter for high-order higher harmonic currents can be limited by selectively determining the time constant $T_s$ and thereby further fine adjustment of the assignment of load to the active filter and the passive filter is possible to provide an active filter having an optimum capacity.

The G(s) is not necessarily a function including a first order lag element, but may be a function including a second order lag element or a function including a higher order lag element or a lead-lag element for the same effect as that described hereinbefore.

Although the second embodiment employs a voltage inverter as the active filter, the voltage inverter may be substituted by a current inverter for the same effect.

A harmonic suppressing device, in a third embodiment, according to the present invention will be described hereinafter with reference to FIGS. 8, 9A, 9B, 12 and 13.

Basically, the constitution of the circuit of the third embodiment is the same as that of the second embodiment shown in FIG. 8 and the single-phase equivalent circuits of the passive filter 3 serving as the high-order higher harmonic filtering unit and the active filter 10 serving as the low-order higher harmonic filtering unit of the third embodiment are substantially the same as those of the second embodiment. In the second embodiment, the PWM control circuit 21 employs the product of the higher harmonic components of the outflow current $I_S$ and the gain G obtained by the gain amplifier 16 as the transfer function. It is a particular feature of the third embodiment to employ a differentiation element for advancing the phase of the outflow higher harmonic current $I_S$ by 90° as a transfer function for the operating means of the active filter 10. Accordingly, the third embodiment will be described with reference to FIG. 8 regarding the gain circuit 16 of FIG. 8 as an operational circuit 16.

A transfer function for the operational circuit 16 includes a differentiation element for advancing the phase of the outflow higher harmonic current $I_S$ by 90° and is expressed by $$G(s)=T_s \tag{8}$$

where $T_s$ is a time constant for differential operation.

Figure 12:
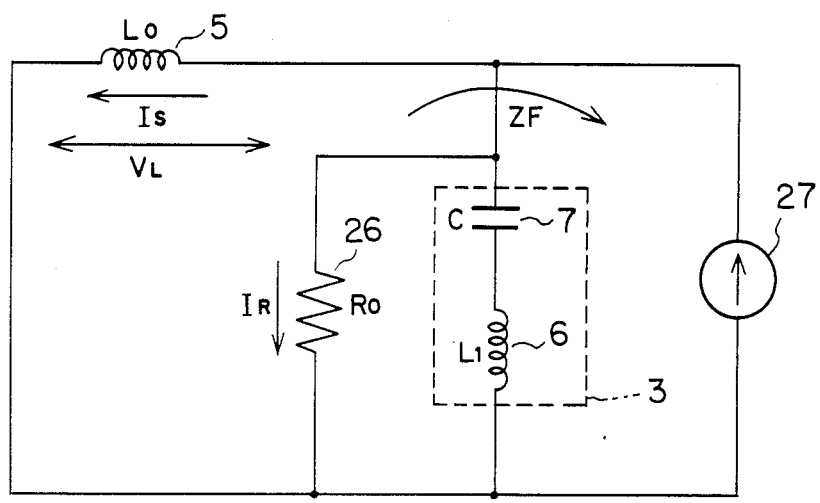
FIG. 12 is a circuit diagram of an equivalent circuit of a harmonic suppressing device, in a third embodiment, according to the present invention.

When the active filter 10 is thus controlled, the function of the active filter 10 is equivalent to a resistance 26 of an equivalent circuit of the harmonic suppressing device shown in FIG. 12. A current source of the equivalent circuit of FIG. 12 corresponds to the higher harmonic current source 2. The equivalent circuit of FIG. 12 is used for calculating the distribution of higher harmonic currents. When a higher harmonic current $I_S$ flows through the power source side, a voltage $V_L$ across the impedance $L_0$ of the system is expressed by $$V_L=L_0 S \cdot I_S \tag{9}$$

therefore, a current $I_R$ that flows through the resistance 26 is $$I_R=V_L/R_0=(L_0S/R_0) \cdot I_S \tag{10}$$

On the other hand, according to the control system of the present invention, the current $I_A$ that flows through the active filter 10 of FIG. 9B is expressed by $$I_A = G(s) \cdot I_S = T_S \cdot I_S \quad (11)$$

when $T = L_0/R_0$. Expressions (10) and (11) coincide with each other, and hence the circuits shown in FIGS. 9B and 12 are entirely equivalent to each other.

Accordingly, the outflow characteristics of the higher harmonic current in the circuit shown in FIG. 12 is determined in the following manner.

The impedance $Z_{F1}$ of the passive filter 3 is $$Z_{F1} = L_1 s + 1/cs \quad (12)$$

Therefore, the total impedance $Z_F$ of the higher harmonic filter side including the damping resistance 26 is $$Z_F = R_0 \cdot Z_{F1}/(R_0 + Z_{F1}) \quad (13)$$

and the higher harmonic current $I_S$ that flows into the power source side is $$I_S = I_H \cdot Z_F/(Z_S + Z_F) \quad (14)$$

provided that $Z_S = L_0 \cdot s$.

Figure 13:
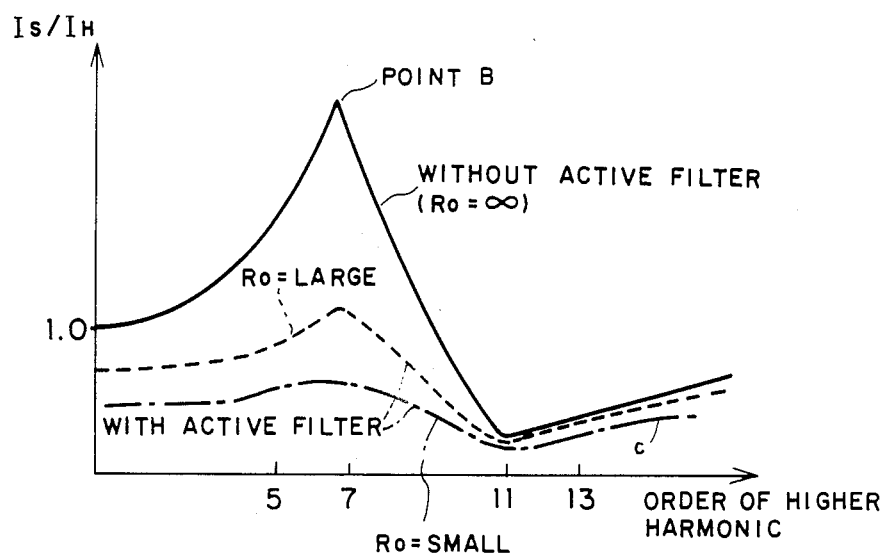
FIG. 13 is a graph showing the antiresonance damping effect of an active filter employed as the low-order higher harmonic filtering unit of the third embodiment.

From Expression (14) frequency characteristics curves shown in FIG. 13 are obtained. As is obvious from FIG. 13, the higher harmonic magnification ($I_S/I_H$) at the anti-resonance point B decreases with the decrease of $R_0$, and $I_S/I_H < 1$ over the entire range of higher harmonic currents as indicated by a curve (c) in FIG. 13 when the resistance $R_0$ of the damping resistance 26 is selected properly. Thus, the harmonic suppressing device is capable of absorbing higher harmonic currents in a wide frequency band without magnifying higher harmonic currents.

Since the characteristics of the damping resistor 26 shown in FIG. 12 can be realized by the control characteristics of the active filter 10, there is no practical loss attributable to the resistance $R_0$ of the resistor 26 and hence the harmonic suppressing device is able to operate at a high efficiency.

Furthermore, since most of the higher harmonic currents in a high-order higher harmonic frequency band above the 11th higher harmonic current are filtered by the passive filter 3 and hence the active filter 10 need not have a capacity to filter such higher harmonic currents, which is economically advantageous.

The harmonic suppressing device thus constituted according to the present invention has the following advantages when applied to suppressing higher harmonic currents generated by, for example, a 12-phase cycloconverter. The principal higher harmonic currents generated by the cycloconverter are 11th, 13th, and 23rd, 25th higher harmonic currents. To absorb all those principal higher harmonic currents by an active filter, the active filter needs to have a very large capacity. Such an active filter is expensive. According to the present invention, the 11th and 13th higher harmonic currents and those of high orders above 13th are absorbed by a comparatively inexpensive passive filter, the magnification of low-order higher harmonic currents attributable to the passive filter is suppressed by an active filter, and comparatively small 5th and 7th higher harmonic currents due to unbalance between the six phases are absorbed by the active filter. Accordingly, the capacity of the active filter may be small, which is economically advantageous.

The third embodiment using a differential function will be described more concretely hereinafter with reference to FIG. 8.

The current transformers 9a, 9b and 9c detect the outflow current $I_S$ that flows into the power source side. The higher harmonic current detecting circuit 14 filters the fundamental component from the current $I_S$ to extract only the higher harmonic components. The higher harmonic components $I_{Ha}$, $I_{Hb}$ and $I_{Hc}$ thus detected are applied to the operating circuits 16a, 16b and 16c, respectively, and are subjected to differ operation.

$$I_{Ga} = G(s) \cdot I_{Ha} = T_S \cdot I_{Ha}$$

$$I_{Ga} = G(S) \cdot I_{Hb} = T_S \cdot I_{Hb}$$

$$I_{Gc} = G(S) \cdot I_{Hc} = T_S \cdot I_{Hc}$$

and then the results of the differential operation are applied to the subtracting circuit 17.

Then, the subtracters 17a, 17b and 17c calculate the difference between the currents $I_{Ga}$, $I_{Gb}$, and $I_{Gc}$, and the output currents $I_{Aa}$, $I_{Ab}$ and $I_{Ac}$ of the active filter 10 detected by the transformers 15a, 15b and 15c, respectively, of the current transformer 15. Then, the differences $\Delta I_a$, $\Delta I_b$ and $\Delta I_c$ are applied to the amplifiers 18a, 18b and 18c, respectively, of the amplifying circuit 18.

The amplifying circuit 18 amplifies the differences $\Delta I_a$, $\Delta I_b$ and $\Delta I_c$ by an amplification factor K, and then gives the results of amplification to the adders 20a, 20b and 20c of the adding circuit 20. The adders 20a, 20b and 20c add the results of amplification and the corresponding supply voltages $V_{Ia}$, $V_{Ib}$ and $V_{Ic}$, respectively, and apply voltages $V_{Ia}$, $V_{Ib}$ and $V_{Ic}$ to the PWM control circuit 21. The PWM control circuit 21 modulates the input voltages $V_{Ia}$, $V_{Ib}$ and $V_{Ic}$, for example, by a triangular carrier signal, and then gives the modulated PWM signals to the switching transistors 12a to 12f.

The switching transistors operate in response to the PWM signals to provide inverter output voltages $E_{Ia}$, $E_{Ib}$ and $E_{Ic}$ respectively corresponding to the control signals $V_{Ia}$, $V_{Ib}$ and $V_{Ic}$.

Consequently, the currents $I_{Aa}$, $I_{Ab}$ and $I_{Ac}$ that flow through the phases, respectively, of the active filter 10 are $$I_{Aa} = (V_a - E_{Ia})/X_L$$

$$I_{Ab} = (V_b - E_{Ib})/X_L$$

$$I_{Ac} = (V_c - E_{Ic})/X_L$$

where $X_L$ is the reactance of the reactor 11.

When the gain K is sufficiently large, the currents $I_{Ha}$, $I_{Hb}$ and $I_{Hc}$ and the corresponding currents $I_A$, $I_{Ab}$ and $I_{Ac}$ coincide with each other, and thereby the active filter 10 is able to make the necessary currents $I_{Ha}$, $I_{Hb}$ and $I_{Hc}$. The output current $I_A$ of the active filter 10 thus controlled is $G(s)$ times the higher harmonic component of the outflow current $I_S$ that flows into the power source side. Therefore, $$I_A = G(s) \cdot I_H = T_S \cdot I_H$$

Thus, the characteristics shown in FIGS. 12 and 13 are obtained.

In the foregoing description, the transfer function G(s) is a differential characteristic $T_S$, however, the transfer function G(s) may be such as including first order differentiation element $(1+T_S)$ or other differentiation element for the same effect as that of the third embodiment. For example, when $G(s)=1+T_S$, the output of the active filter for higher order higher harmonic currents can be limited by regulating the time constant T and thereby further fine adjustment of the assignment of load to the active filter and the passive filter is possible to provide an active filter having an optimum capacity.

Prior to the description of fourth to seventh embodiments of the present invention, the principle of compensation function of an active filter will be described with reference to FIGS. 14 and 15.

Figure 14:
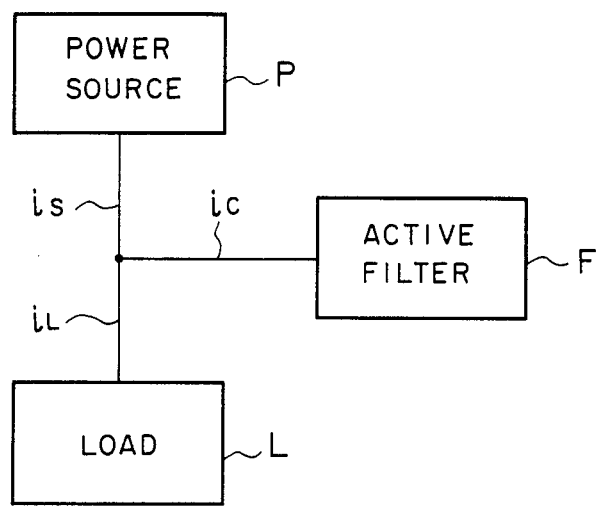
FIG. 14 is a block diagram of assistance in explaining the principle of a harmonic suppressing device according to the present invention, showing the disposition of an active filter in an associated circuit.
Figure 15:
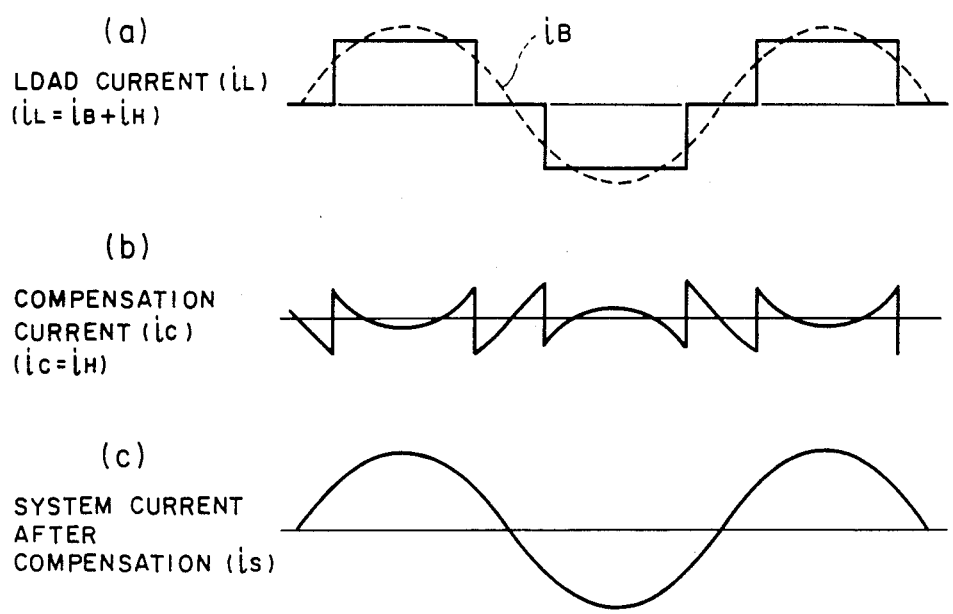
FIGS. 15(a), 15(b) and 15(c) are current waveform charts of assistance in explaining the principle of compensation function of the active filter of FIG. 14.

As shown in FIG. 14, an active filter F is connected in parallel to a load L generating higher harmonics. Referring to FIGS. 15(a), 15(b) and 15(c) showing the principle of compensation of higher harmonics generated by a six-pulse rectifier included, by way of example, as a load in a system, a compensation current $i_H$ contained in a load current $i_L$ is operated to apply a compensation current $i_C$ to a set point. Thus, the active filter F functions as a higher harmonic current source and supplies, as a substitute for a power source P, a higher harmonic current required by the load L, and thereby the supply current contains only a fundamental wave current $i_B$.

A voltage type inverter employing a voltage source or a current type inverter employing a current source is an active filter which turns on and off a semiconductor switching device provided in the filter and which supplies the compensation current $i_C$ compensating the higher harmonic current $i_H$. The active filter produces the compensation current $i_C$ as the compensation object from a DC voltage; the active filter operates at a response frequency exceeding the frequency of the compensation current $i_C$; therefore, the active filter needs to be capable of high-frequency switching operation of the semiconductor switching device. However, since the operation speed of the semiconductor switching device is limited, the switching frequency band in which the active filter is able to operate most effectively is low to middle frequency bands.

Figure 16:
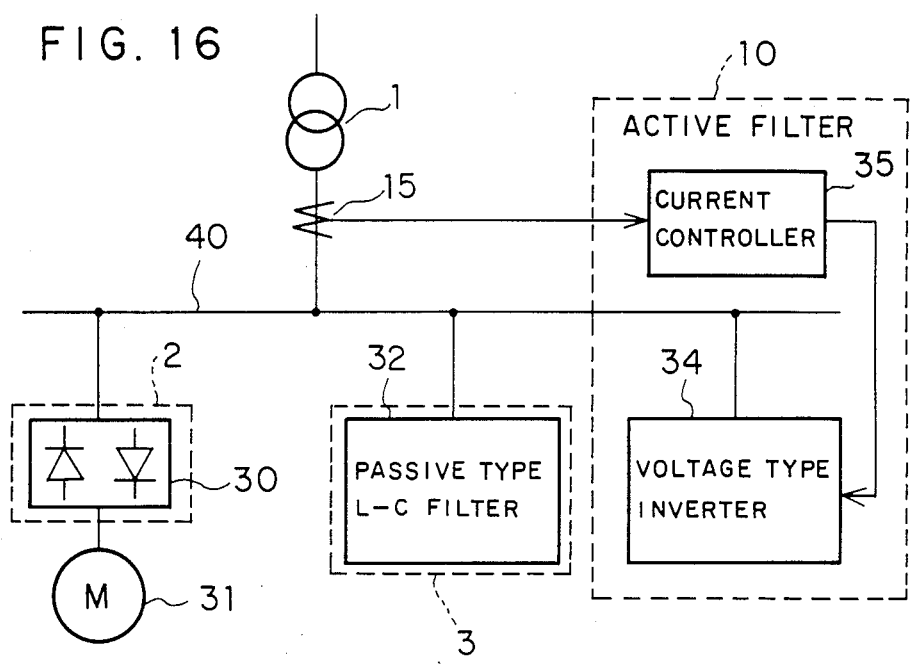
FIG. 16 is a block diagram of a harmonic suppressing device, in a fourth embodiment, according to the present invention.

A fourth embodiment of the present invention will be described hereinafter. Referring to FIG. 16, there are shown an AC power source 1, a higher harmonic generating source 2 comprising a load such as a cycloconverter 30, a motor 31 controlled by the cycloconverter 30, a passive L-C filter 32 serving as a high-order higher harmonic filtering unit for compensating higher harmonics in a high-order frequency band. The passive L-C filter 32 is connected in parallel to the cycloconverter 30 to the same bus 40. Also shown in FIG. 16 is a source current feedback type active filter 10 for compensating higher harmonics in low and middle frequency bands. The active filter 10 is capable of actively controlling the frequency of compensation higher harmonics. The source current feedback type active filter 10 comprises a voltage type inverter 34 and a current controller 35 for controlling the voltage type inverter 34. The source current feedback type active filter 10 detects the current of the power source by means of a current detector 15 and filters a fundamental wave current $i_B$ from the detected current to obtain a higher harmonic current $i_H$ to be compensated. The current controller 35 operates and amplifies the difference between the higher harmonic current $i_H$ and an output higher harmonic current component to provide a reference voltage. The reference voltage is applied after being subjected to PWM control to the voltage type inverter 34.

Thus, the higher harmonic absorbing circuit has the passive L-C filter 32 which tunes with higher harmonics in a high frequency band, and the active filter 10 which effectively filters antiresonance which occurs in a low frequency band and higher harmonics in a middle frequency band.

In operation, the harmonic suppressing device absorbs higher harmonics in a high frequency band by the passive L-C filter 32 and absorbs higher harmonics of the antiresonance and higher harmonics in a frequency band lower than the tuning frequency of the passive L-C filter 32 by the active filter 10 to eliminate the adverse influence of higher harmonics generated by the higher harmonic current generating source 2, namely, the load cycloconverter 30, on the component equipments of the power system. Thus, the cooperative function of the passive L-C filter 32 and the active filter 10 provides frequency characteristics eliminated of antiresonance.

Figure 17:
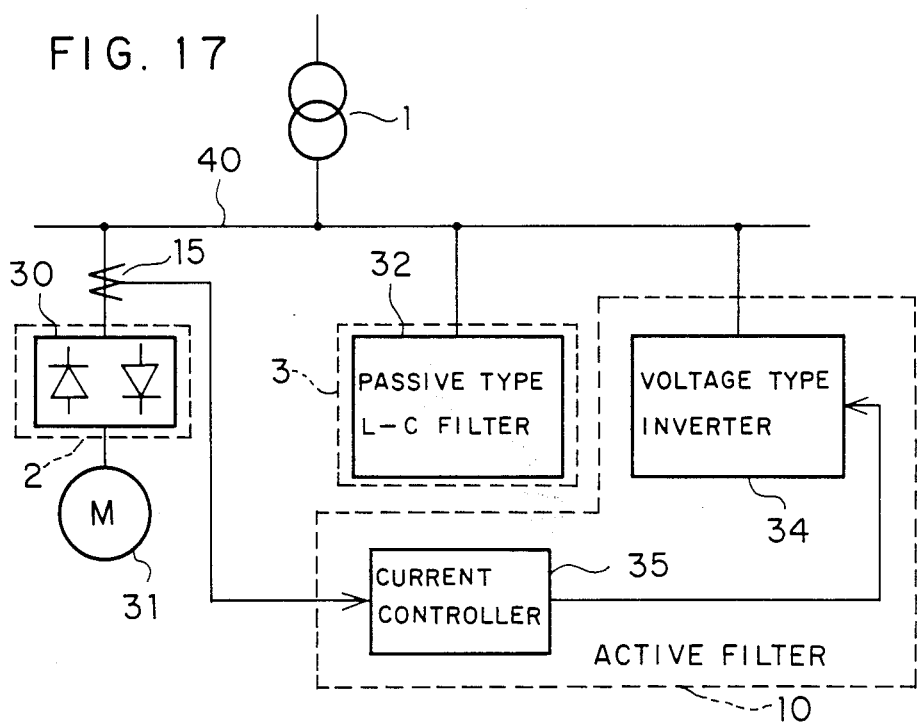
FIG. 17 is a block diagram of a harmonic suppressing device, in a fifth embodiment, according to the present invention.

A fifth embodiment of the present invention will be described with reference to FIG. 17. In the fifth embodiment, a current detector 15 for detecting a higher harmonic current $i_H$ generated by a load cycloconverter 30 is provided between the load cycloconverter 30 and a bus 40. The current detector 15 supplies the detected higher harmonic current $i_H$ to a current controller 35. Therefore, an active filter 10 employed in the fifth embodiment is a load current feedback active filter.

The load current feedback active filter 10 comprises, as the basic components, a voltage type inverter 34 and the current controller 35 for controlling the current of the voltage type inverter 34. The load current feedback active filter 10 detects the difference between a command current and an actual current, then a hysteresis comparator discriminates the polarity of the difference and gives a signal corresponding to the polarity of the difference to a power semiconductor switching element to control the current.

Figure 18:
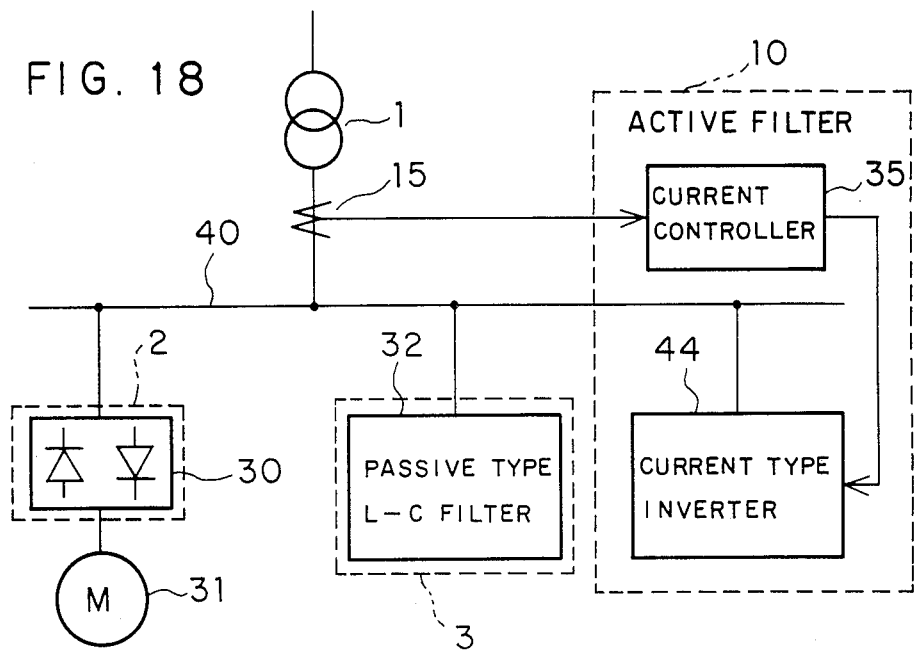
FIG. 18 is a block diagram of a harmonic suppressing device, in a sixth embodiment, according to the present invention.

A sixth embodiment of the present invention will be described hereinafter. Referring to FIG. 18, the sixth embodiment is substantially the same as the fourth embodiment in constitution, except that the source current feedback active filter 10 of the sixth embodiment comprises a current controller 35 and a current type inverter 44. Since the active filter 10 is of a source current feedback type, a current detector 15 for detecting a higher harmonic current which flows into the AC power source 1 is provided near the AC power source 1, and the inverter of the active filter 10 is the current type inverter 44. The current type inverter 44 is capable of directly controlling the output current of an objective cycloconverter control system. The current type inverter 44 controls the system current so that the frequency of the output current of the system is stabilized at a fixed frequency. An exemplary practical current type inverter is a series diode insertion type capacitance commutation inverter.

Figure 19:
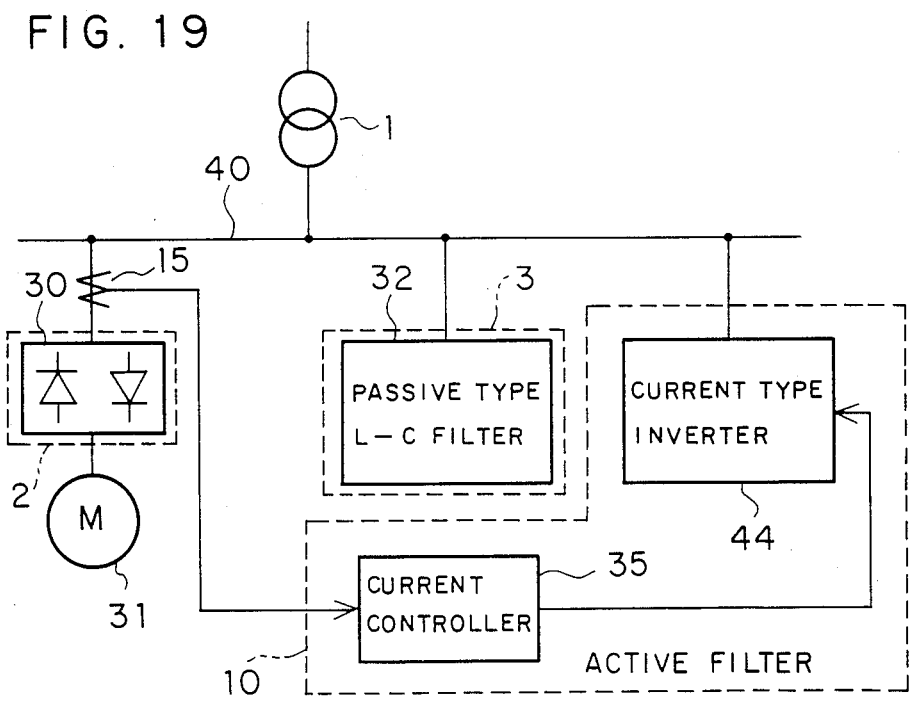
FIG. 19 is a block diagram of a harmonic suppressing device, in a seventh embodiment according to the present invention.

A seventh embodiment of the present invention will be described hereinafter. Referring to FIG. 19, the seventh embodiment is the same as the fourth to sixth embodiments in the basic constitution. In FIG. 19, there are shown an AC power source 1, a cycloconverter 30, namely, a higher harmonic current generating source 2, and a high-order higher harmonic filtering unit 3 comprising a passive L-C filter 32. The seventh embodiment is characterized by the employment of a current type inverter 44 of a load current feedback system. A higher harmonic current generated by the cycloconverter 30, i.e., the load 2, is detected by a current detector 15 provided near the load 2. Then, the difference between a command current and an actual current is detected on the basis of the current detected by the current detector 15 by a current controller 35 and the current type inverter 44, and then a hysteresis comparator discriminates the polarity of the difference, and then provides a signal corresponding to the polarity of the difference to control a power semiconductor switching element.

The sixth and seventh embodiments have intrinsic excellent response characteristics in controlling the current of the power system owing to the employment of the current type inverter 44.

As apparent from the foregoing description of the preferred embodiments of the present invention, the use of an active filter and a passive filter in combination enables the suppression of higher harmonic currents which flows into the power source circuit over the entire frequency band even if the frequencies of higher harmonic currents generated by the load are variable, and reduces the manufacturing cost of the harmonic suppressing device.

Furthermore, since the principal higher harmonic currents among the higher harmonic currents generated by the load are absorbed by the passive filter comprising a capacitor and a reactor, and the parallel resonance of the passive filter and the impedance of the power source circuit is suppressed and only the higher harmonic currents in a frequency band which cannot be absorbed by the passive filter are absorbed by the active filter connected in parallel to the passive filter, the capacity of the active filter may be comparatively small, which reduces the manufacturing cost of the harmonic suppressing device capable of satisfactorily suppressing the magnification of higher harmonic currents.

Still further, since the harmonic suppressing device of the present invention is capable of suppressing the parallel resonance by advancing the phase of the higher harmonic currents that flow into the power source circuit by a fixed phase angle, higher harmonic currents are suppressed efficiently over a wide frequency band.

What is claimed is:

1. A harmonic suppressing device comprising:
a passive filter comprising a series connection of a capacitor and a reactor, and serving as a high-order higher harmonic filtering unit for filtering higher harmonic currents of comparatively high orders in a frequency band around a tuned point among higher harmonic currents generated by the higher harmonic current source of a power system;
an active filter serving as low-order higher harmonic filtering unit for filtering higher harmonic currents of comparatively low orders in a frequency band around an antiresonance point among those generated by said higher harmonic current source, connected in parallel to said passive filter and adapted so as to be controlled on the basis of a value obtained by multiplying the detected value of a higher harmonic current that flows into the power source side beyond the connecting point of said passive filter and a power source by a fixed gain;
said active filter comprising: a main active filtering circuit comprising a parallel connection of a plurality of switching transistors, diodes connected in parallel to said switching transistors, respectively, and a capacitor; and control means for controlling said switching transistors for on-off operation; and
said control means comprising a PWM control circuit capable of carrying out PWM control on the basis of a value obtained by processing through subtraction, amplification and addition the output of a gain circuit which executes a first order lag operation by multiplying the detected values of higher harmonic currents that flow into the power source side of said power system by a fixed gain, the detected current values of the output currents of said main active filtering circuit, and the detected voltage values of higher harmonic currents generated by said higher harmonic current source and flowing into the power source side of said power system.

2. A harmonic suppressing device as recited in claim 1, wherein said passive filter is a high-order higher harmonic filtering unit constituted so as to filter higher harmonic currents of comparatively high orders in the range of order of the eleventh to the thirteenth about the resonance point.

3. A harmonic suppressing device as recited in claim 1, wherein said active filter is a low-order higher harmonic filtering unit constituted so as to filter higher harmonic currents of comparatively low orders i the range of order of the fifth to the seventh about antiresonance point.

4. A harmonic suppressing device comprising:
a passive filter serving as a high-order higher harmonic filtering unit comprising a series connection of a capacitor and a reactor and capable of filtering higher harmonic currents of comparatively high orders in a frequency band around a tuned point among those generated by a higher harmonic current source; and
an active filter serving as a low-order higher harmonic filtering unit for filtering higher harmonic currents of comparatively low orders in a frequency band around a resonance point, comprising:
a main active filtering circuit comprising a parallel connection of a plurality of switching transistors, diodes connected in parallel to said switching transistors, respectively, and a capacitor connected in parallel with said parallel connection of switching transistors; and
control means comprising: operating means which processes through a predetermined advancing operation the detected values of higher harmonic currents that flow into the power source side of said power system beyond the connecting point of said passive filter and said power system; and control means for controlling said switching transistors for on-off operation by a control output obtained by subjecting the detected current values of the output currents of said main circuit, and detected voltage values detected in the neighborhood of said higher harmonic current source on the basis of the results of operation of said operating means to addition, subtraction and amplification.

5. A harmonic suppressing device as recited in claim 4, wherein said control means for controlling said main active filtering circuit is a PWM control circuit of a pulse width modulating system for controlling said main active filtering circuit for on-off operation, and said operating means is a differential operating circuit which processes the detected current values of the higher harmonic currents that flow into the power source side through phase advancing operation.

6. A harmonic suppressing device as recited in claim 4, wherein said passive filter serving as a high-order higher harmonic filtering unit filters high-order harmonic currents of orders of the 11th to 13th, and said active filter serving as a low-order higher harmonic filtering unit filters low-order higher harmonic currents of orders of the 5th to 7th.

7. A harmonic suppressing device as recited in claim 4, wherein said passive filter filters high-order higher harmonic currents of orders of the 23rd to 25th, and said active filter filters low-order higher harmonic currents of orders of the 5th to 7th.

8. A harmonic suppressing device as recited in claim 4, wherein said higher harmonic current source of said power system is a cycloconverter including a semiconductor device for converting the power of said power system.

9. A harmonic suppressing device as recited in claim 4, wherein said passive filter and said active filter are provided in a three-phase alternating current circuit comprising a three-phase alternating current power source, and a cycloconverter for converting the frequency of the power supplied from said three-phase alternating current power source.

* * * * *

UNITED STATES PATENT AND TRADEMARK OFFICE
CERTIFICATE OF CORRECTION

PATENT NO. : 4,812,669

DATED : March 14, 1989

INVENTOR(S) : Masatoshi Takeda et al.

It is certified that error appears in the above-identified patent and that said Letters Patent is hereby corrected as shown below:

Column 4, line 55, "so" should be --source.--.

Column 7, at line 52, insert the following:

$$--Z_F = L_1 \cdot S + 1/C \cdot S + R--.$$

Column 8, line 15, in equation (7) delete "tm";

same line, "(7)" should be moved to the right-hand side of the column.

Column 9, line 41, "$S_L$" should be --$X_L$--.

Column 10, line 54, after "source" insert --27--.

Column 12, line 13, "differ" should be --differential--;

line 15, "(s)" should be --(S)--.

UNITED STATES PATENT AND TRADEMARK OFFICE
CERTIFICATE OF CORRECTION

PATENT NO. : 4,812,669

DATED : March 14, 1989

INVENTOR(S) : Masatoshi Takeda et al.

It is certified that error appears in the above-identified patent and that said Letters Patent is hereby corrected as shown below:

Column 12, line 17, "$I_{Ga}$" should be --$I_{Gb}$--;

line 58, "$I_A$" should be --$I_{Aa}$--.

Signed and Sealed this

Fifteenth Day of May, 1990

Attest:

HARRY F. MANBECK, JR.

*Attesting Officer*  *Commissioner of Patents and Trademarks*